Jan. 19, 1932.   G. RÖHR   1,841,849
AUTOMOBILE
Filed June 19, 1930
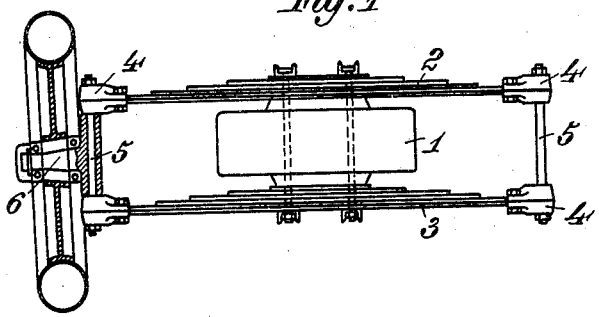
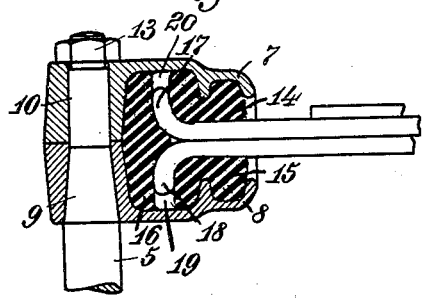
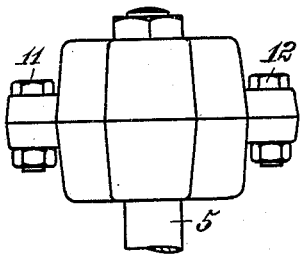
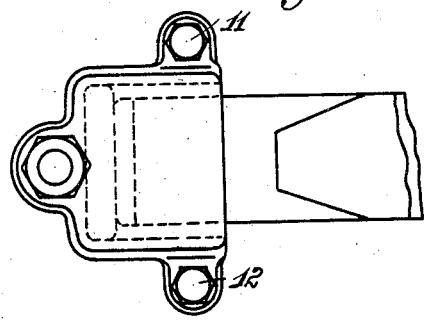
Inventor:
Gustav Röhr
By
Attorney Patented Jan. 19, 1932

1,841,849

UNITED STATES PATENT OFFICE

GUSTAV RÖHR, OF OBERRAMSTADT, GERMANY

AUTOMOBILE

Application filed June 19, 1930, Serial No. 462,371, and in Germany June 26, 1929.

My invention relates to the connection of transverse springs of automobiles with the hinge bolts of the steering swivels of the front wheels, this connection being established by means of spring shoes fitted with rubber cushions.

As is well known, it is aimed at in designing automobiles to absorb the shocks at each individual wheel with means independently of the other wheels. To this end the usual front axle has been replaced by two transverse springs fixed intermediate their ends to the frame and carrying on their freely projecting ends the hinge bolts whereon the journals of the front wheels may rotate. The connection between the springs and the respective hinge bolts has been carried out heretofore by spring bolts that rest in eyes formed on the springs by rolling them. These spring bolts, however, must be lubricated and they soon work out by wear, more particularly so since the bolts are not protected against the penetration of dirt and moisture. In order to eliminate these drawbacks the spring bolts of normal longitudinal springs have already been replaced with good success by rubber supports which need not be lubricated and are not subjected to any appreciable wear.

Now my present invention relates to the connection of transverse springs with the hinge bolts. This problem, which needs to be applied only to automobiles having transverse springs in lieu of a front axle, requires a special design of the spring shoes. According to my invention the spring shoes are divided in a horizontal plane, more particularly intermediate the ends and fitted with rubber cushions so that the spring ends embedded therein do not come in contact with any metal part. Furthermore, I provide hinge bolts which at the point where they enter the spring shoe have no constriction or other weak place, as it is just at this place of the entrance in the shoe that the danger of breakage is particularly great. I attain a satisfactory entrance of the hinge bolt in the spring shoe by the bolt fitting tapering into the inner half of the shoe. The outer half thereof has a cylindrical bore so that by tightening the nut on the upper end of the bolt at the same time the two shoe halves are tightened on one another and the hinge bolt firmly engages the two halves.

In order that my invention can be more readily understood, an embodiment of the same is illustrated by way of example in the accompanying drawings in which Figure 1 is a diagrammatic front view of two transverse front springs of an automobile with the two hinge bolts and one of the front wheels, Figure 2 is a section through one of the shoes arranged on the ends of the transverse springs, on an enlarged scale, Figure 3 is an external side view of this spring shoe, and Figure 4 is a top view of the shoe.

Referring to these drawings, 1 denotes the frame of the car and 2 and 3 the two transverse springs which on their ends each carry a shoe 4 which connects the springs to the hinge bolts 5. On these bolts 5 are rotatably mounted the wheel journals 6.

Each of the spring shoes 4 consists of a casing having two halves 7 and 8 which include rubber cushions 14, 15 and 16 and resemble one another except the bores for the bolt 5. To rigidly connect the bolt 5 with the shoe, the former fits with a tapering portion 9 into a correspondingly tapering bore of the outer shoe half, while the inner shoe half has a cylindrical bore 10 corresponding to the cylindrical end portion of bolt 5. This tapering portion of the bolt establishes a gradual entrance of the bolt whereby the danger of breakage is prevented.

The shoes of the lower spring exactly correspond to those of the upper ones, but are of course mounted in inverted position so as to correspond in position to the lower end of the bolts 5.

The two shoe halves are held together both by the hinge bolt 5 and by two screw bolts 11 and 12. Upon tightening the latter and the nut 13 on bolt 5 the rubber cushions 14, 15 and 16 are tensioned so as to closely embrace the two bent-off edges 17 and 18 of the spring. The cushions 14 and 15 have lateral lugs 19 and 20 which separate the spring leaves from the shoe also laterally so that any metallic contact between the springs and the shoes is avoided.

What I claim and desire to secure by Letters Patent is:—

In an automobile having two superposed transverse front springs, a steering swivel hinge bolt extending between the two spring ends of each side, a rubber cushion shoe on each spring end, said shoes being horizontally divided so as to form two halves, a vertical cylindical bore in each outer shoe half and a tapering coaxial bore in the companion inner half, the ends of said hinge bolts fitting into said bores, and means on said bolts for holding said shoe halves together.

In testimony whereof I affix my signature.

GUSTAV RÖHR.